No. 813,880. PATENTED FEB. 27, 1906.
J. K. GOURDIN.
AXLE BEARING.
APPLICATION FILED SEPT. 15, 1905.
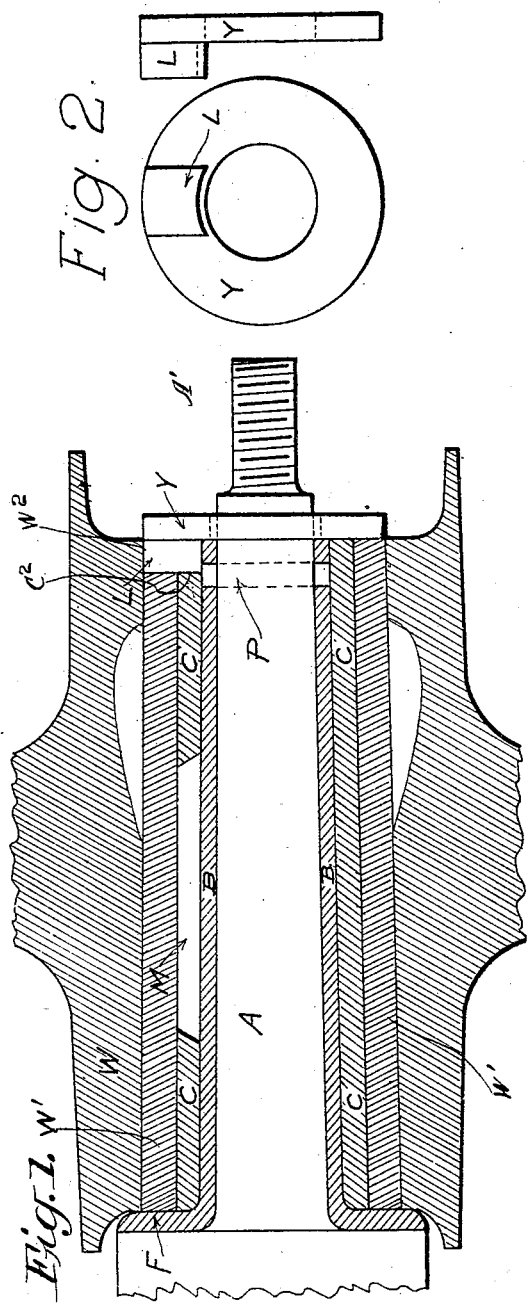
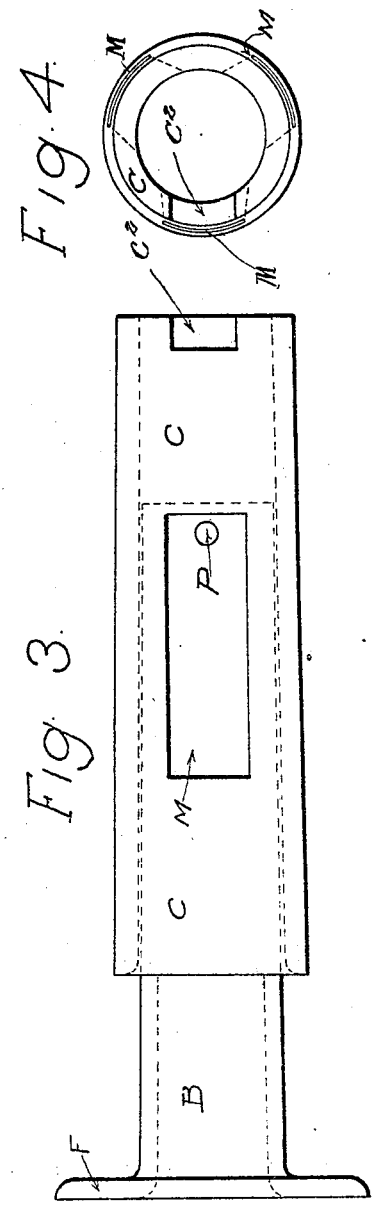
Witnesses
Inventor
JOHN K. GOURDIN
per Munn & Co.
Attorneys.

UNITED STATES PATENT OFFICE.

JOHN K. GOURDIN, OF PINEVILLE, SOUTH CAROLINA, ASSIGNOR OF ONE-HALF TO ROBERT L. MONTAGUE AND ROBERT P. TUCKER, OF CHARLESTON, SOUTH CAROLINA.

AXLE-BEARING.

No. 813,880. Specification of Letters Patent. Patented Feb. 27, 1906.

Application filed September 15, 1905. Serial No. 278,632.

*To all whom it may concern:*

Be it known that I, JOHN K. GOURDIN, a citizen of the United States, residing at Pineville, in the county of Berkeley and State of South Carolina, have made certain new and useful Improvements in Axle-Bearings, of which the following is a specification.

My invention is an improvement in wheel-hubs and spindles; and it consists in certain novel constructions and combinations of parts, as will be hereinafter described and claimed.

In the drawings, Figure 1 is a longitudinal section illustrating the improvement. Fig. 2 illustrates in side and edge view the washer for locking the hub-skein and boxing together. Fig. 3 is a detail plan view showing the hub-skein and spindle-skein, the latter being partially within the former; and Fig. 4 is a detail end view of the hub-skein.

The spindle A is provided at its outer end with a threaded tenon to receive a nut for securing the washer Y in place and for holding the wheel-hub W upon the spindle. The spindle-skein B is fitted over the spindle A, is provided at its inner end with an outwardly-turned flange F, which abuts against the outwardly-facing shoulder at the inner end of the spindle, and this skein B is secured detachably on the spindle by means of a cross-pin P, passing through the spindle and skein B near the outer end of the latter and in such position that when the hub-skein C is fitted over the skein B it will overlie the said pin P and prevent any displacement of the same.

The outwardly-turned flange F at the inner end of the skein B at approximately a right angle forms a bearing to receive the wear and to relieve the axle-arm of such wear in the use of the invention. By means of the pin P the skein B is held from turning with the wheel in the operation of the invention.

The hub-skein C fits within the wheel-boxing W' and is held thereto by the means presently described, so it will turn with the hub W in the operation of the invention. This skein C turns on the skein B and is provided, preferably about midway between its ends, with an opening or openings M, in which lubricant may be placed when the wheel is removed from the spindle, and such lubricant will be evenly distributed to the spindle-skein as the wheel turns thereon. The hub-skein W', fitting over the skein C, closes the lubricant-openings M, as will be understood from Fig. 1 of the drawings.

The hub-skein W' is fitted and held within the hub and is provided in its outer end with a notch $W^2$, which in the position of parts shown in Fig. 1 coincides with a notch $C^2$ in the outer end of the hub-skein C. A washer Y, fitted over the outer end of the spindle, is provided on its inner side with a lug L, which fits within the slots $C^2$ and $W^2$ and locks the hub-skein and the boxing W' together, so the said parts turn upon the spindle with the revolution of the wheel. This washer Y is held upon the spindle by means of a nut on the tenon A' or, if desired, by any other suitable securing means.

In operation it will be noticed the spindle-skein receives the wear of the wheel and by its end flange F receives the end thrust of the wheel-hub, relieving the spindle and the shoulder at the inner end thereof of all wear. The hub-skein having the openings for the lubricant aids in lubricating the bearing and by turning with the wheel takes up all wear upon the hub-bearing, so that when the skeins are worn they may be readily removed and a new bearing provided by simply supplying new skeins. The washer Y, with its lug L, is a simple means for holding the skein to the boxing, so that the skein C will turn with the wheel in the use of the invention.

Having thus described my invention, what I claim as new, and desire to secure by Letters Patent, is—

1. The combination substantially as herein described, of the spindle, the spindle-skein fitted over the spindle and having at its inner end the outwardly-turned flange, the cross-pin for holding the skein on the spindle, the hub-skein fitting over the spindle-skein and provided with an opening or openings for lubricant, and having in its outer end a slot, said hub-skein overlying the cross-pin for securing the spindle and spindle-skein together, whereby to prevent displacement of said pin, the hub, the hub-boxing fitted over the hub-skein, and covering the lubricant-opening therein and provided in its outer end with a slot coinciding with that in the hub-skein, and the washer fitted over the spindle and provided on its inner side with a lug entering the coincident slots in the hub-skein and boxing, all substantially as and for the purposes set forth.

2. The combination with a hub, of a skein fitted therein and having an opening formed through it, and constituting a lubricant-chamber, and the hub-boxing fitted over said skein and covering the lubricant-chamber therein, coincident slots being formed in the outer ends of the boxing and skein and a washer having a lug entering said slots, substantially as set forth.

3. The combination with the hub, of the boxing held therein, and the hub-skein within the boxing, said boxing and skein being provided at their outer ends with coincident slots, and a locking device having a lug fitted in said slots for keying the boxing and skein together, substantially as set forth.

4. The combination with the spindle and the spindle-skein held thereon, of the hub, the hub-skein fitting over the spindle-skein, and the boxing within the hub and fitting over the hub-skein, said boxing and hub-skein being provided in their outer ends with coincident slots, and a washer having an inwardly-projecting lug entering the coincident slots, substantially as set forth.

JOHN K. GOURDIN.

Witnesses:
SOLON C. KEMON,
PERRY B. TURPIN.